United States Patent [19]
Nagel

[11] 3,807,834
[45] Apr. 30, 1974

[54] TRAFFIC SIGNAL LENS

[75] Inventor: Robert I. Nagel, Skokie, Ill.

[73] Assignee: Gulf & Western Industries, Inc., New York, N.Y.

[22] Filed: July 24, 1972

[21] Appl. No.: 274,750

[52] U.S. Cl. ............................. 350/167, 240/106.1
[51] Int. Cl. .................................... G02b 27/00
[58] Field of Search ................. 350/167; 240/106.1; 340/107, 108

[56] References Cited
UNITED STATES PATENTS
3,222,516   12/1965   Miles .............................. 350/167 X
3,620,600   11/1971   Lindberg ............................ 350/167

*Primary Examiner*—John K. Corbin
*Attorney, Agent, or Firm*—Meyer, Tilberry & Body

[57] ABSTRACT

A traffic signal lens is provided which is preferably formed of polycarbonate material. The lens has spherical inner and outer surfaces and the inner surface is covered by a mosaic arrangement of lenticular elements. Five distinct lenticular element configurations are provided on the inner surface in a pattern which is symmetrical with respect to a diametrical line extending across the inner surface of the lens. Three of the five forms of lenticular elements have cylindrical outer surfaces, and these three element forms are distinct from one another in that the radii of curvature of the outer surfaces thereof are different one from the others. A fourth of the five forms of lenticular elements have outer surfaces defining a partial section of a toroid, whereby the outer surfaces thereof curve about axes perpendicular to one another. The fifth of the five forms of lenticular elements have planar outer surfaces. The elements of each of the five forms of lenticular elements have different light directing or diverting characteristics, and the elements are oriented relative to the inner surface of the lens and the lens axis to provide for maximum efficiency of the lens in projecting light into a desired lens viewing area.

53 Claims, 13 Drawing Figures

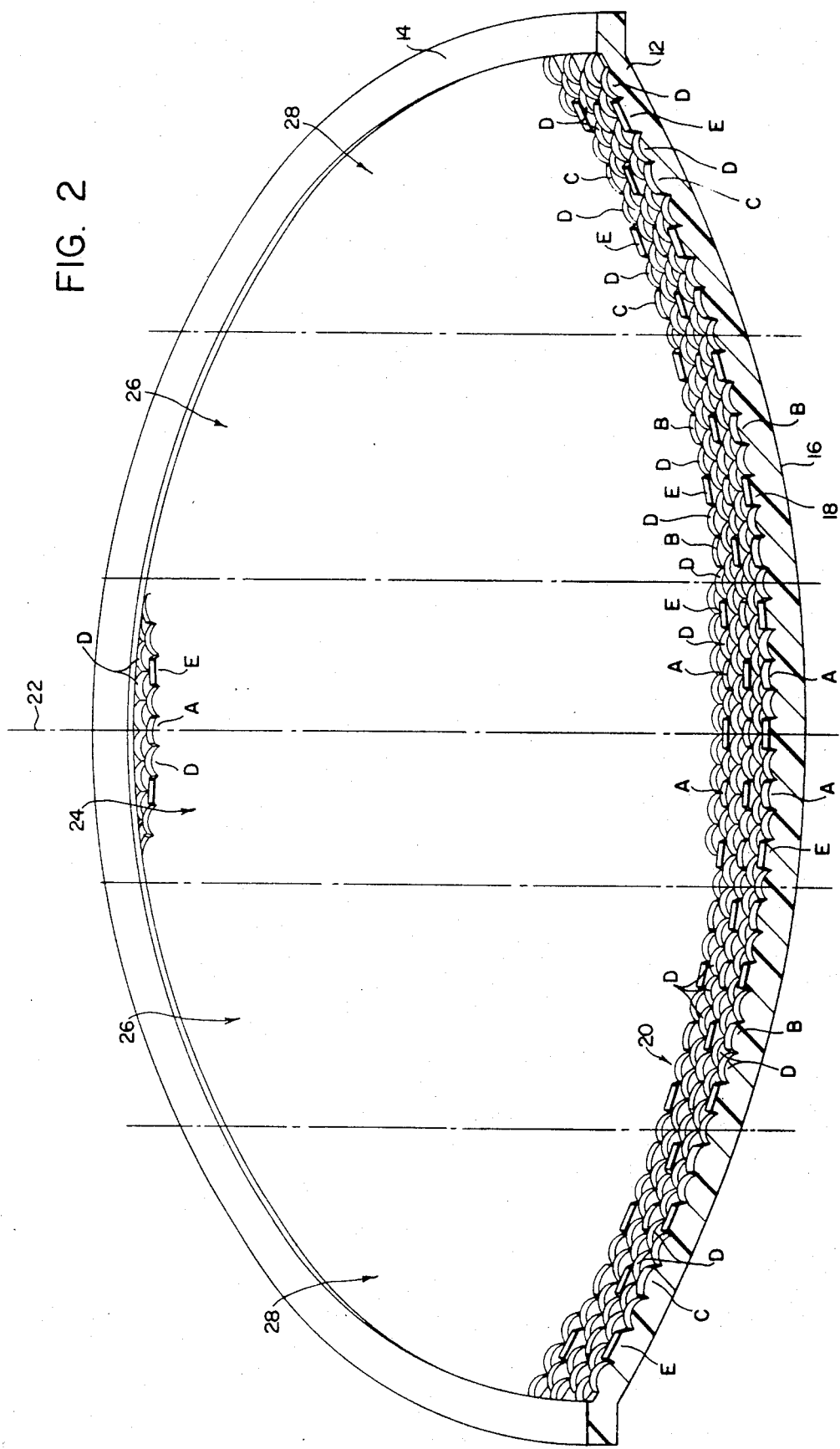

TRAFFIC SIGNAL LENS

The present invention relates to the art of traffic signals and, more particularly, to a lens structure for a traffic signal.

Traffic or other warning signals for pedestrians or vehicles include a housing, a plurality of housings or a plurality of housing sections each of which is provided with a parabolic reflector, an incandescent light bulb located at the focus of the reflector, and a lens which covers the front of the reflector. Such signal devices generally are mounted over a street or sidewalk, such as at an intersection, for example, and are operated by suitable controls to regulate the movement of pedestrian or vehicular traffic. Light from the incandescent bulb is reflected toward the lens and is projected therethrough so that the light is visible to an observer viewing the lens from an area in front of the signal. The observer may be a pedestrian or the driver of a vehicle and, for most efficiency operation of the signal, substantially all of the light projected through the lens should be directed into the desired range of observation of the observer. If the observer is the driver of a vehicle he must be able to see the signal light from a considerably greater distance in front of the signal than a pedestrian. Accordingly, a considerably higher magnitude of illumination must be provided in the center of the total range of observation than at the fringes of the range. Maximum efficiency also requires that a major portion of the projected light be directed slightly downwardly from the horizontal axis of the signal lens since the observer must view the signal from below the horizontal axis thereof.

In addition to the foregoing light directing aspects, it is also desirable to control lateral light directing characteristics of the lens to control lateral scattering of light and the consequent loss in the magnitude of light directed forwardly of the signal. It will be appreciated, especially with regard to a vehicle driver, that a reduction in the magnitude of light directed laterally of the signal, in a manner whereby the light which would be otherwise directed laterally is directed in a more forwardly direction, increases the effective distance ahead of the signal at which the signal can be observed by an approaching vehicle driver. In view of the present day operation of road vehicles at relatively high speed, early detection by a vehicle operator of a traffic or other warning signal is quite advantageous from the standpoint of reducing the possibility of an accident resulting from his failure to see the signal sufficiently in advance thereof to apply his brakes and stop or take other diversionary action.

Heretofore, traffic signal lenses have been formed of frosted or patterned glass, or of acrylic material, in which the pattern generally is of a random nature. Such lenses are quite insufficient for several reasons, one of which is that there is a considerable lateral scattering of light which reduces the intensity of illumination within the desired viewing range. In lenses of the latter character, little or no effort has been made to control light projection in a manner to provide a desired pattern of illumination which is particularly advantageous to the distant observer. Further, previous efforts to achieve a desired light directing pattern by providing particular lens contours have resulted in difficulty and expense with regard to manufacturing procedures in that complex molds are required. Moreover, difficulty is experienced in obtaining the degree of mold accuracy necessary for the formation of the lenticular surfaces to provide the desired lens efficiency.

As mentioned hereinabove, traffic signal lenses heretofore have been produced either from glass or acrylic materials. Glass lenses are extremely difficult to manufacture, are heavy and are easily cracked, borken or otherwise damaged both prior to and during use. Lenses of acrylic materials overcome certain of the disadvantages of glass, but acrylic lenses have the disadvantage of being unable to withstand high temperatures such as are encountered when the lens is employed in a signal equipped with a 100 watt bulb. In this respect, the high temperature to which the material is elevated during use results in deformation of the lens and loss of color thereof, whereby the efficiency of the lens is undesirably reduced.

The foregoing disadvantages, and others, of traffic and other warning signal lenses heretofore known are advantageously overcome or avoided in accordance with the present invention. In this respect, a signal lens is provided having an inner surface substantially covered by lenticular elements each of which is contoured and oriented relative to the inner surface so as to direct light forwardly and downwardly with respect to the lens axis. Certain of the lenticular elements have a contour and orientation which provides for these elements to direct light primarily in a direction forwardly and downwardly relative to the lens axis, and others of the lenticular elements have an outer surface contour and orientation relative to the inner surface of the lens to provide for light to be directed downwardly and laterally with respect to the lens axis. The contour and orientation of each of the lenticular elements relative to the inner surface of the lens is such that the extent of downward and lateral light directing thereby is controlled to provide a desired overall pattern of light direction which provides for the intensity of the light directed forwardly of the lens to be observed more readily and at a greater distance from the lens than heretofore possible.

In accordance with one aspect of the present invention the light directing characteristics are ahcieved by employing a plurality of each of five distinct lenticular elements on the inner surface of the lens. One of the five groups of lenticular elements is predominant in number and defines a field of lenticular elements on the inner surface of the lens. The elements of the other four groups are interspersed in the field and, preferably, in a pattern which provides for the lenticular elements of all of the groups together to provide a desired light projecting capability for the lens as a unit.

Preferably, the predominant lenticular elements defining the field on the inner surface of the lens are substantially identical in contour and orientation relative to the inner surface of the lens. These elements, preferably, each have an outer surface defining a portion of a section of a toroid and thus have an outer surface which curves about axes which are perpendicular to one another. The outer surfaces of these elements are curved in one direction relative to the inner surface of the lens to direct light downwardly relative to the lens axis and are curved in the opposite direction relative to the inner surface of the lens to provide for lateral directing of light relative to the lens axis.

The groups of lenticular elements interspersed in the field include a group having planar surfaces inclined with respect to the inner surface of the lens so as to direct light forwardly and downwardly of the lens axis. Further, among the groups of elements interspersed throughout the field is at least one group of elements having cylindrical outer surfaces inclined with respect to the inner surface of the lens. The cylindrical outer surfaces are inclined so that these elements direct light forwardly and downwardly relative to the lens axis, and the cylindrical outer surfaces thereof provide for the elements to direct light laterally with respect to the lens axis.

In accordance with another aspect of the present invention, three groups of the lenticular elements having cylindrical outer surfaces are interspersed in the field across the inner surface of the lens. The lenticular elements of any one of the three groups have contours similar to the elements of the other two groups in that the outer surfaces of all of the elements are cylindrical. The elements of any one group, however, are dimensionally distinct from the elements of the other two groups in that the radii of curvature of the cylindrical surfaces of the elements in each of the three groups are different one from the other two. Thus, the elements in these three groups have different characteristics with respect to directing light laterally of the lens axis.

In accordance with yet another aspect of the present invention, the lenticular elements having planar surfaces and the lenticular elements having cylindrical outer surfaces are interspersed in the field of elements having outer surfaces defining a portion of a section of a toroid in a pattern symmetrical with respect to the lens axis or a diametrical line extending vertically across the field. Moreover, the lenticular elements having cylindrical surfaces which have the shortest radius of curvature are interspersed in the field to lie in an area centrally of the field and to either side of the diametrical line. The elements having cylindrical surfaces having the longest radius of curvature are disposed in the field in areas thereof spaced from the outer sides of the central area, and the elements having cylindrical outer surfaces having the intermediate radius of curvature are disposed in areas of the field to either side of the central area and intermediate the central and corresponding outer areas of the field.

The lenticular elements of which the cylindrical outer surfaces are of the shortest radius of curvature have greater lateral light directing capability and are located centrally of the lens where a greater magnitude of lateral light is desired. The elements of which the cylindrical outer surfaces are the longest radius of curvature are disposed furthest from the diametric line across the field and in areas closer to the lateral peripheral edges of the lens where less light scattering or lateral light directing is desired. Thus, in the preferred embodiment, five types of light directing or diverting lenticular elements cover the inner surface of the lens and are arranged thereon in a pattern which advantageously provides for the lens to function primarily to direct light forwardly and downwardly within predetermined limits relative to the horizontal axis of the lens and to provide for controlled lateral directing of light in manner whereby the forward light directing capability is increased and the loss of light intensity in the forward and downwardly direction is minimized.

An outstanding object of the present invention is the provision of a traffic signal lens which directs substantially all of the projected light into a viewing range of an observer.

Another object of the present invention is the provision of a traffic signal lens which directs projected light in a manner whereby the intensity of light directed into the viewing range is greater than heretofore possible.

Yet another object of the present invention is the provision of a traffic signal lens which provides for light to be directed into the viewing range in a manner whereby loss of light intensity due to lateral scattering of light is minimized.

A further object of the present invention is the provision of a traffic signal lens which may be more accurately and efficiently manufactured than previous lenses and which is more durable against physical damage such as cracking or breaking and is more durable against color loss and deformation resulting from the heat generated by the light bulb of the traffic signal assembly.

Yet a further object of the present invention is the provision of a traffic signal lens comprised of a plurality of light directing lenticular elements substantially covering a surface thereof and structurally configured and oriented relative to the surface so that the individual elements cooperate for the lens as a unit to direct substantially all of the projected light into a desired viewing range of an observer.

Still a further object of the present invention is the provision of a traffic signal lens having a surface substantially covered by a plurality of groups of distinct lenticular elements having different light directing characteristics and which together provide for the lens to have desired light directing characteristics.

Still another object of the present invention is the provision of a traffic signal lens wherein the groups of distinct lenticular elements are arranged in patterns relative to the lens surface and in positions and orientations relative to the surface which provide for the groups of elements to function in a most efficient manner for the lens as a unit to have the desired light directing capability.

The foregoing objects, and others, will in part be obvious and in part more fully pointed out hereinafter in conjunction with the description of the accompanying drawing in which:

FIG. 2 is a vertical sectional view taken along line 2—2 in FIG. 1;

Figure 1:
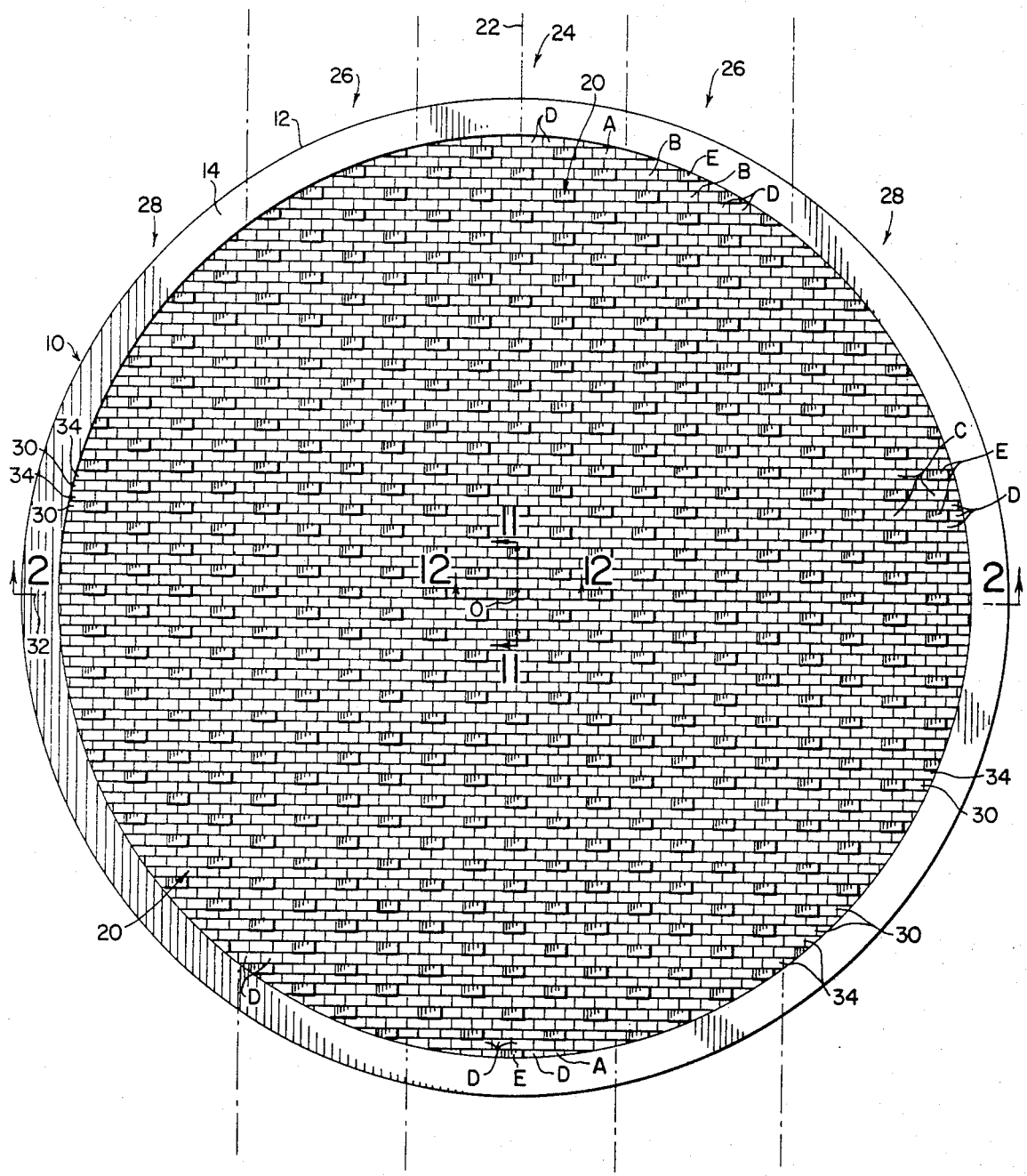
FIG. 1 is a rear elevation view of a traffic signal lens made in accordance with the principals of the present invention.
Figure 1A:
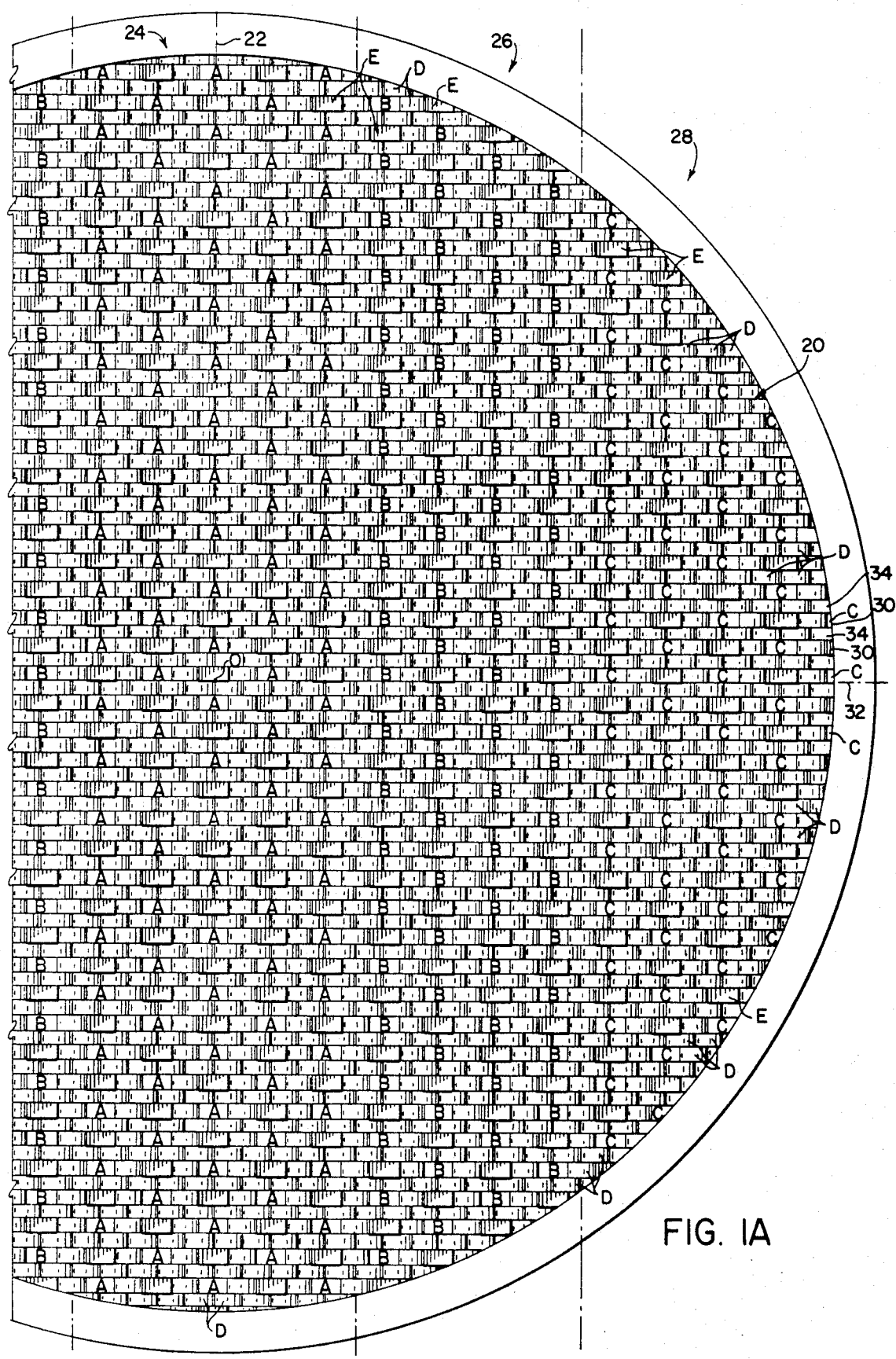
FIG. 1A is an enlarged rear elevation view of a portion of the lens illustrating the preferred pattern of lenticular elements.

Referring now to the drawings in greater detail wherein the showings are for the purpose of illustrating a preferred embodiment of the present invention only and not for the purpose of limiting the same, a traffic signal lens 10 is illustrated in FIGS. 1, 1A, and 2 which is comprised of a body portion 12 of generally spherical contour and having an annular rim portion 14 bounding spherical outer and inner surfaces 16 and 18, respectively, of the body portion. Outer surface 16 is substantially smooth and inner surface 18 is substantially covered by a multiplicity of lenticular elements designated generally by the numeral 20. Lenticular elements 20 are integral with the lens body and preferably are juxtaposed relative to one another across the lens whereby inner surface 18, in effect, is an imaginery surface. Preferably, the lens is produced from a polycarbonate material so that it will have the desired strength characteristics and stability against color fading and deformation from the heat of a light bulb of the traffic signal assembly with which the lens is employed. It will be appreciated, however, that other materials may be employed to produce a lens having the light directing characteristics achieved in accordance with the principals of the present invention.

In the preferred embodiment, inner surface 18 of the lens body is completely covered by a multiplicity of lenticular elements designated generally by the numeral 20. Each lenticular element, when projected onto a plane perpendicular to the lens axis O, is rectangular, and the projected horizontal width and vertical heighth dimensions of the elements are the same. The multiplicity of lenticular elements 20 is defined by groups of elements A, B, C, D and E which latter elements include outer surfaces distinctly contoured and/or distinctly dimensioned relative to one another and to the inner surface of the lens, as described more fully hereinafter. Elements A, B, C, D and E are arranged across inner surface 18 in a pattern with respect to a vertical diametrical line 22 and in horizontal rows extending across the inner surface in a direction perpendicular to line 22. All of the lenticular elements A, B and C are identified by the corresponding letter in FIG. 1A, the lenticular elements E are identified in FIG. 1A by cross hatching, and all of the remainder of inner surface 18 of the lens is covered by lenticular elements D.

As is best seen in FIGS. 1, 1A and 2, the inner surface of the lens is divided into laterally adjacent sections including a central section 24 in which lenticular elements A are disposed, intermediate sections 26 on opposite sides of central section 24 and in which lenticular elements B are disposed, and outer sections 28 in which lenticular elements C are disposed. The elements A, A and B, or A, B and C are disposed in horizontal rows 30, and the appearance of elements A, B and C in these rows is dependent on the location of the particular row vertically of the horizontal diametric line 32 of the lens, as is evident from FIG. 1A of the drawing. In each of the sections 24, 26 and 28 the lenticular elements A, B or C thereof are laterally separated from one another in rows 30 and from the lenticular element A, B or C in the laterally adjacent section by a pattern of lenticular elements D and E. The latter pattern is defined in each instance by two lenticular elements D and an intermediate element E. Further, the rows 30 of elements A, A and B, or A, B and C are each vertically spaced apart by rows 34 each of which is defined in its entirety by lenticular elements D. The lenticular elements in vertically adjacent ones of the rows 30 and 34 are laterally offset relative to one another, whereby a staggered or brick-like pattern is defined by the lenticular elements throughout the area of the inner surface of the lens. This pattern, as will be seen from FIG. 1A, provides for the lenticular elements D in vertically adjacent rows 34 to be disposed in vertical alignment with one another. Further, the elements A, A and B or A, B and C are positioned laterally in rows 30 and in their corresponding section of the inner surface of the lens such that each of the elements A, B or C in one row 30 is disposed in vertical alignment with an element E in the next adjacent row 30 in either direction vertically from the one row. Still further, the pattern of one row 30 is repeated every third row designated 30, whereby the corresponding elements A, B or C in the one row 30 and the second row 30 therefrom in either direction are vertically aligned. It will be appreciated that while the pattern is repeated in the foregoing manner in alternate rows 30, the lateral extent of the rows and accordingly the extent to which the pattern is repeated in the rows will vary depending on the location of the row relative to horizontal diametric line 32 of the lens.

Figure 3:
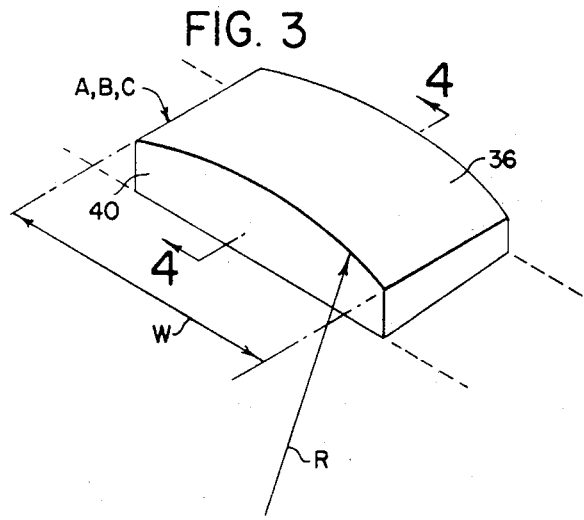
FIG. 3 is a perspective detail view of a lenticular element of the lens illustrated in FIG. 1.
Figure 4:
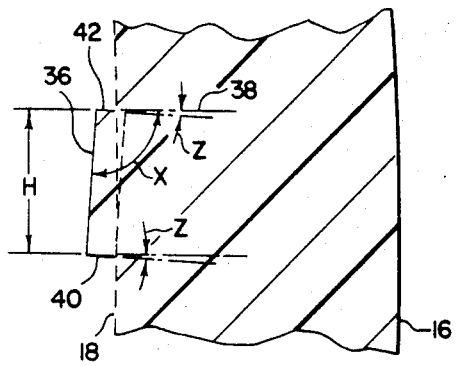
FIG. 4 is a sectional elevation of the lenticular element illustrated in FIG. 3, the section being taken along line 4—4 in FIG. 3.

Referring now to FIGS. 3 and 4 of the drawing, a lenticular element is illustrated in detail which corresponds in outer surface contour to lenticular elements A, B and C. It should be noted here that lenticular elements A, B and C have a similar outer surface contour but are dimensionally distinct from one another as pointed out more fully hereinbelow. The outer surface of each of the elements A, B and C has a projected horizontal width dimensions W, a projected vertical heighth dimension H, and a cylindrical outer surface 36 curving in the horizontal direction and having a uniform radius of curvature R. Further, cylindrical outer surface 36 is inclined relative to inner surface 18 of the body portion of the lens so as to direct light downwardly relative to axis O of the lens. The angle of incline for each of the elements A, B and C relative to inner surface 18 is the same and is determined by inclining surfaces 36 at an angle X with respect to a reference line 38. Line 38 extends through the lens body at the upper end and horizontally centrally of the element and is normal or perpendicular to outer and inner surfaces 16 and 18 of the lens in the area thereof in which the particular element A, B or C is disposed. Each of the elements A, B and C has a lower face 40 and an upper face 42. Faces 40 and 42 are planar and preferably are inclined slightly from horizontal so as to provide a sufficient draft or clearance angle to permit the lens to be removed from a mold in which it is formed. The draft angle is indicated in FIG. 4 as Z. The specific dimensions of the element will, of course, vary depending on the overall lens size and other considerations, and the dimensions and angles for the preferred embodiment of the lens as set forth in Table 1 hereinbelow.

Figure 5:
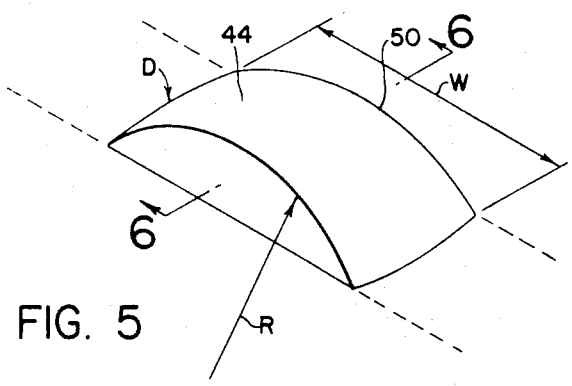
FIG. 5 is a perspective detail view of another lenticular element of the lens illustrated in FIG. 1.
Figure 6:
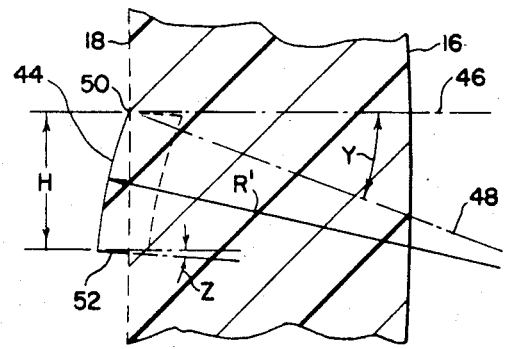
FIG. 6 is a sectional elevation of the lenticular element illustrated in FIG. 5, the section being along line 6—6 in FIG. 5.

FIGS. 5 and 6 of the drawing illustrate a lenticular element D in detail. The outer surface of each of the elements D has a projected horizontal width dimension W and a projected vertical heighth dimension H. Further, each of the elements D has an outer surface 44 defining a partial section of a toroid. In this respect, outer surface 44 curves in the horizontal direction and the radius of curvature of the surface in this direction is represented by the letter R. Radius R is the same at the lower and upper ends of elements D. Surface 44 curves in the vertical direction and the radius of curvature of the surface in this direction is represented by the letter R' in FIG. 6. The reference point for the radius of curvature R' is determined by establishing a line 46 normal to outer and inner surfaces 16 and 18 of the lens at the upper end of the element and horizontally centrally thereof, establishing a reference line 48 extending downwardly at a predetermined angle Y relative to line 46 from the point of intersection of line 46 and surface 18, and then measuring along line 48 from the point of intersection a distance corresponding to radius R'. As mentioned hereinabove outer surface 44 curves horizontally and has a radius of curvature R at the upper and lower ends thereof. Further, outer surface 44 has a horizontal mid point 50 at its upper end which is disposed adjacent inner surface 18 of the lens. Accordingly, the horizontally opposite side edges of surface 44 extend into the body portion of the lens from inner surface 18 towards outer surface 16 progressively from the lower to the upper end of the element, as illustrated in FIG. 6. In a manner similar to that described hereinabove with regard to elements A, B and C, elements D have a lower planar surface 52 which is slightly inclined with respect to horizontal to provide a draft angle Z. The dimensions of elements D will vary and can be varied depending on the lens size and the desired light directing characteristics, and the dimensions and angles of the preferred embodiment of the present invention are set forth in Table 1 hereinbelow.

Figure 7:
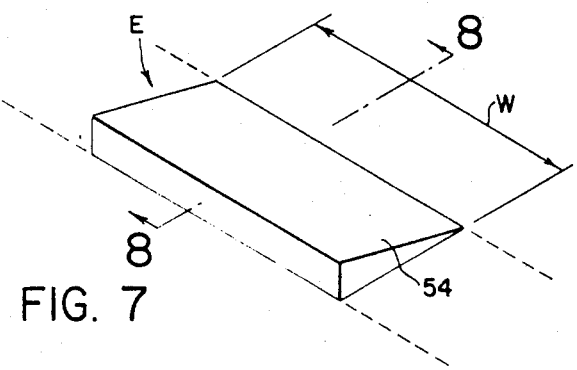
FIG. 7 is a perspective detail view of yet another lenticular element of the lens illustrated in FIG. 1.
Figure 8:
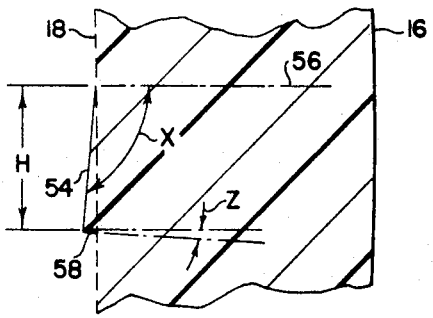
FIG. 8 is a sectional elevation view of the lenticular element illustrated in FIG. 7, the section being taken along line 8—8 in FIG. 7.

Lenticular elements E are illustrated in FIGS. 7 and 8 of the drawing. Elements E each include a planar outer surface 54 having a projected horizontal width dimension W and a projected vertical heighth dimension H. Outer surface 54 of each element E is inclined to the same extent relative to inner surface 18 of the body portion of the lens, and the incline is determined by an angle X between outer surface 54 and a reference line 56 extending normal to outer and inner surfaces 16 and 18 of the lens at the upper end of element E in the area of the lens in which the particular element is located. Further, the plane of outer surface 54 is normal in the horizontal direction to line 56. In a manner similar to elements A, B, C and D, elements E have a planar lower end surface 58 which is slightly inclined relative to horizontal to define a draft angle Z. The dimensions of elements E and the angle of incline thereof can vary depending on lens size and the particular light diverting characteristics sought, and the dimensions for the preferred embodiment of the lens are set forth hereinafter in Table 1.

As discussed more fully hereinafter, the incline of cylindrical surfaces 36 of elements A, B and C relative to inner surface 18 of the lens, the curvature of outer surfaces 44 of elements D vertically toward inner surface 18 of the lens and the incline of planar surfaces 54 of elements E toward inner surface 18 of the lens provide for each of these elements to direct or divert light downwardly relative to the horizontal axis of the lens. Further, the curvature of cylindrical surfaces 36 of elements A, B and C in the horizontal direction and the curvature of surfaces 44 of elements D in the horizontal direction provide for these elements to have light directing capabilities in directions lateral with respect to a line horizontally centrally therethrough and normal to the inner and outer surfaces of the lens and, accordingly, with respect to axis O of the lens.

Figure 9:
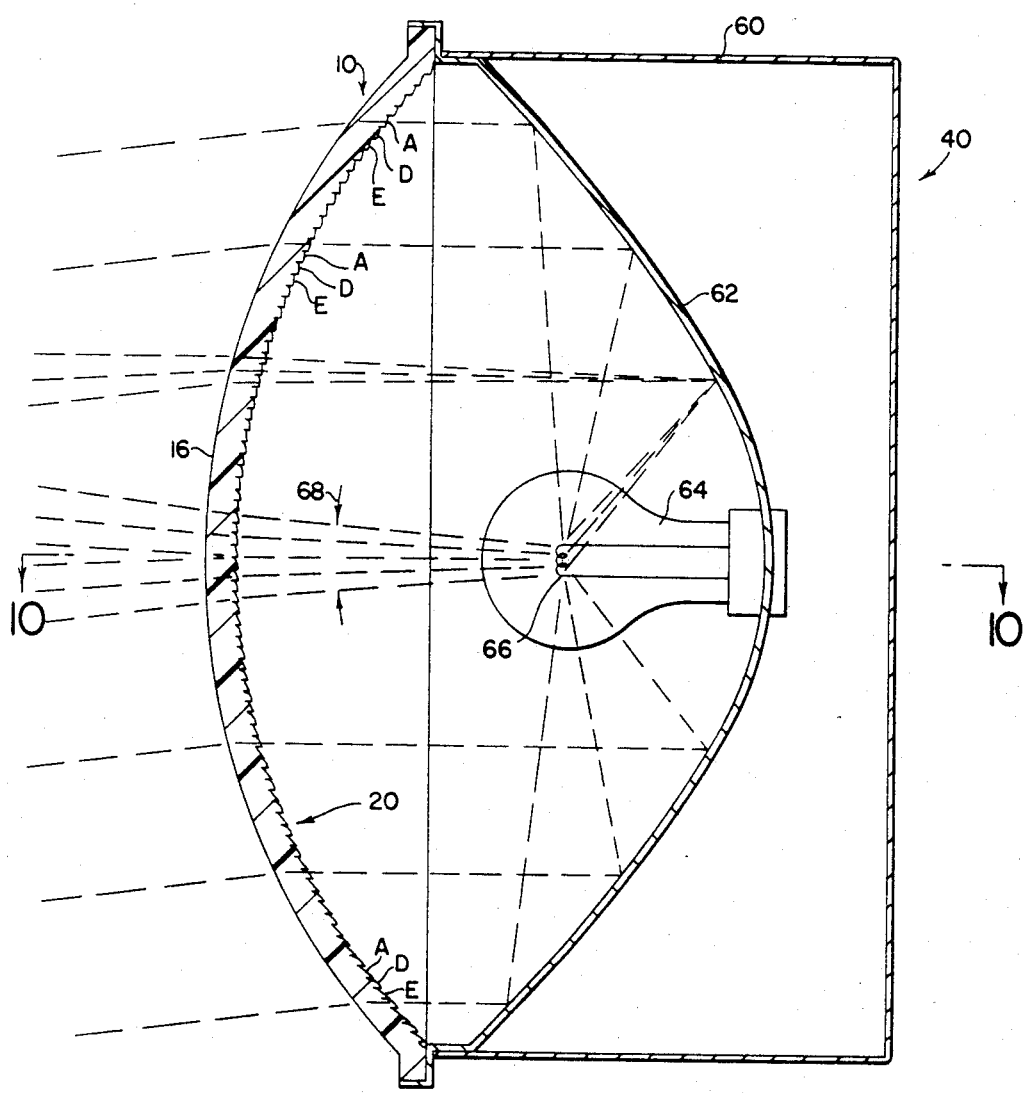
FIG. 9 is a sectional elevation of a traffic signal housing incorporating the lens illustrated in FIG. 1.
Figure 10:
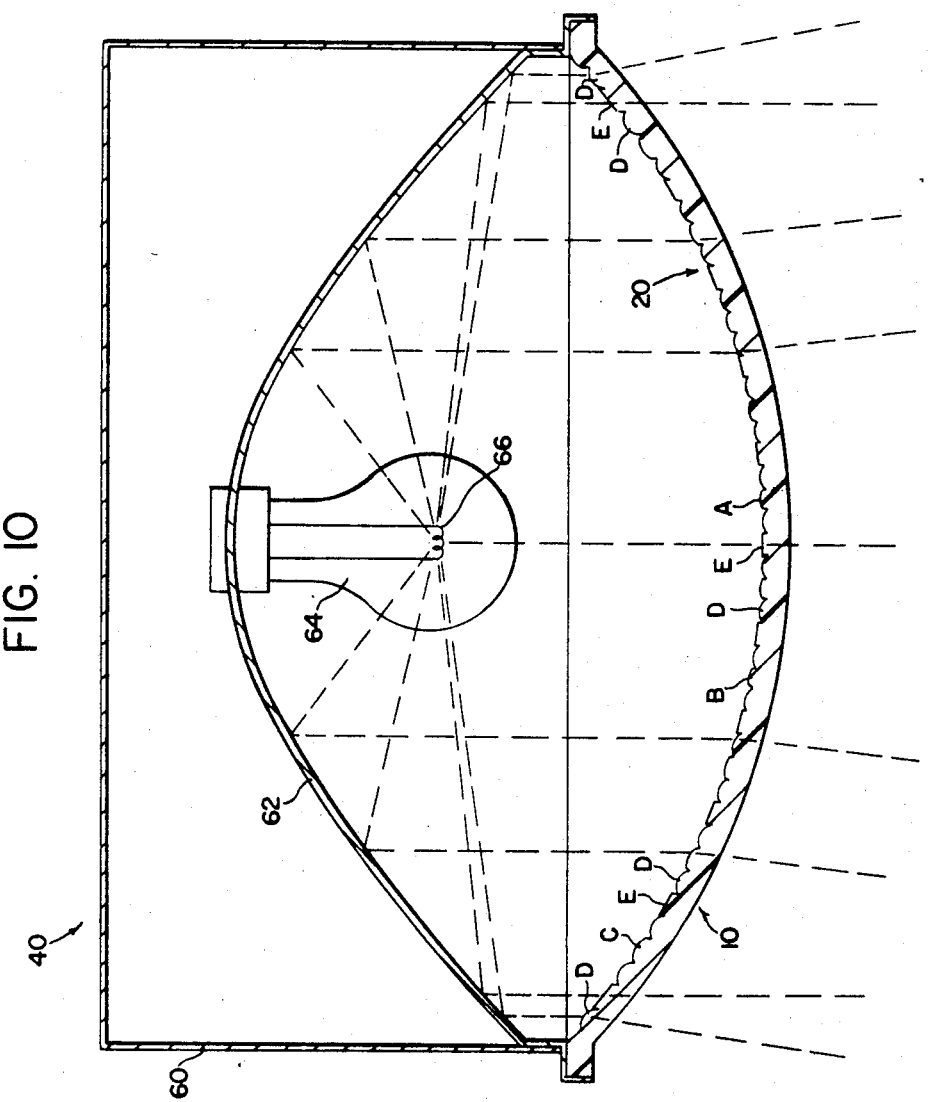
FIG. 10 is a plan view, in section, of the traffic signal illustrated in FIG. 9, the section being along line 10—10 in FIG. 9.
Figure 11:
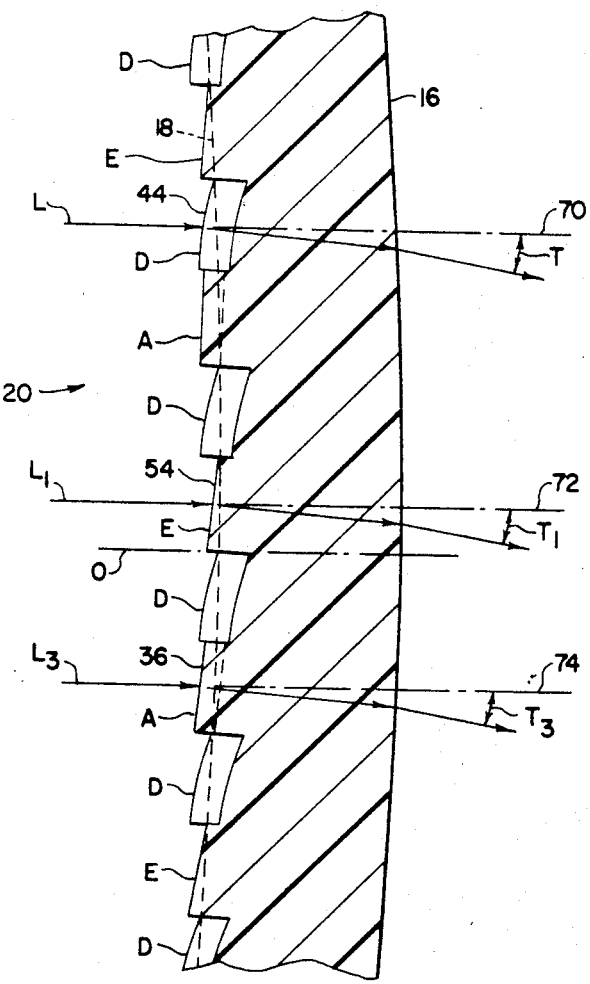
FIG. 11 is a sectional elevation view taken along line 11—11 in FIG. 1, and illustrates certain light directing characteristics of the lenticular elements of the lens.

Referring now to FIGS. 9 and 10 of the drawing, a lens 10 is illustrated in its assembled relationship with respect to a traffic signal housing 60 in which a parabolic reflector 62 is suitably supported together with a light bulb 64 which is disposed at the focus of reflector 62. Light bulb 64 has a filament 66 therein which provides the light source when energized to incandescence. In FIG. 9, which is a sectional elevational view, beams of light from bulb 64 are reflected forwardly toward lens 10 by reflector 62 and substantially parallel to lens axis O. Thus, the beams of light are reflected toward the outer surfaces of elements A, B, C, D and E on the inner surface 18 of the lens. The outer surface contours and orientations of these elements on the inner surface of the lens provide for these elements to direct light downwardly from horizontal. More particularly, as illustrated in FIG. 11, a light beam L reflected toward a vertically central area of the lens is reflected horizontally toward surface 44 of a lenticular element D in the latter area along a horizontal path 70, and the curvature of surface 44 in the vertical direction toward inner surface 18 of the lens provides for the light beam to be diverted downwardly toward spherical outer surface 16 of the lens. At outer surface 16 of the lens beam L is further diverted slightly downwardly whereby the light beam is projected forwardly and downwardly of the lens at an angle T with respect to horizontal path 70. Similarly, a light beam L1 reflected toward a vertically central area of the lens is reflected horizontally toward the inclined planar surface 54 of a lenticular element E in the latter area along a horizontal path 72 and is diverted downwardly by surface 54 toward spherical outer surface 16 of the lens and thence further downwardly at outer surface 16. Thus, light beam L1 is projected forwardly and downwardly of the lens at an angle T1 from horizontal path 72. Still further, a light beam L3 reflected toward a vertically central area of the lens is reflected horizontally toward cylindrical outer surface 36 of an element A along a path 74. The incline of surface 36 relative to inner surface 18 of the lens provides for the light beam to be diverted downwardly from horizontal toward spherical outer surface 16 of the lens. At outer surface 16 the light beam is further diverted downwardly so that the light beam is projected forwardly and downwardly of the lens at an angle T3 relative to horizontal path 74.

The angles at which the beams of light are directed downwardly relative to horizontal by elements A, B, C, D and E in any given horizontal row of elements will vary in accordance with the incline or curvature of the outer surface of the corresponding element in the vertical direction relative to inner surface 18 of the lens. Like elements in a given row preferably have the same incline or curvature relative to lens surface 18, whereby the angle of light diversion relative to horizontal in a given row is the same for the like elements from one side of the lens to the other. However, since like ones of the elements A, B, C, D and E have the same contour and outer surface orientation relative to the inner surface of the lens, the angle of light diversion relative to horizontal of like elements will vary from one horizontal row to the next in either direction vertically of the horizontal diametric line 32 of the lens. The largest variance will occur between elements in the rows generally vertically centrally of the lens and like elements in the rows near the top and bottom of the lens. In this respect, for example, as can be seen in FIG. 9 the outer surfaces of elements A, D and E in the upper area of the lens are inclined at a greater angle relative to the lens axis O than the centrally disposed elements due to the curvature of lens surfaces 16 and 18 relative to the lens axis. The inclined orientation of the outer surfaces of the lenticular elements in the extreme upper portion of the lens causes these elements to divert some light upwardly as well as downwardly from horizontal. It will be appreciated, however, that the number of lenticular elements in the upper region of the lens is extremely small relative to the number of elements in the remaining area therebeneath, whereby the total mangitude of light projected upwardly is minimal and is confined to the upper region of the lens including approximately the uppermost 5 or 6 rows of elements.

With regard to the lenticular elements in the lower area of the lens, it will be seen from FIG. 9 that the outer surfaces of these elements are also inclined at a greater angle relative to lens axis O then the centrally disposed elements due to the curvature of lens surfaces 16 and 18 relative to axis O. The inclined orientation of the elements in the lower region relative to horizontal, therefore, causes these elements to divert light downwardly to a greater extent from horizontal than the corresponding elements in the lens area thereabove. It will be appreciated, however, that the number of lenticular elements in the lower region is extremely small relative to the number of elements in the remaining area of the lens, whereby the total magnitude of light diverted downwardly from the lower area of the lens at these greater angles is minimal. Further, the light directed downwardly by the elements in the lower region of the lens is beneficial with respect to observation of the signal by pedestrians or vehicle operators located closely in front of and beneath the signal.

As mentioned hereinabove, light diversion relative to horizontal varies in the vertical directions from the horizontal center line 32 of the lens and is the same from side to side for like elements in any given horizontal row of elements. Accordingly, it will be appreciated that the most desirable forward and downward light directing characteristics are provided for by the elements A, B, C, D and E in the vertically central area of the lens which is defined, approximately, by the horizontal rows across the inner surface in which all three elements A, B and C appear. The vertically central area of the lens includes a very predominant percentage of the total number of lenticular elements in the lens and, accordingly, provides a high magnitude of light projection into the desired viewing range forwardly of the lens. The areas of the lens above and below the central region are of much smaller area due to the circular peripheral contour of the lens, whereby the light diverting characteristics of the elements in these areas, to the extent that they project light upwardly or at an greater angle downwardly from horizontal, do not detract from the overall efficiency of the lens. It will be appreciated that the lenticular elements in the upper and lower areas of the lens contribute both to the forward and downward projection of light and to the provision of a desired magnitude of peripheral light projection to enhance viewing of the signal from locations other than directly forward thereof.

Figure 12:
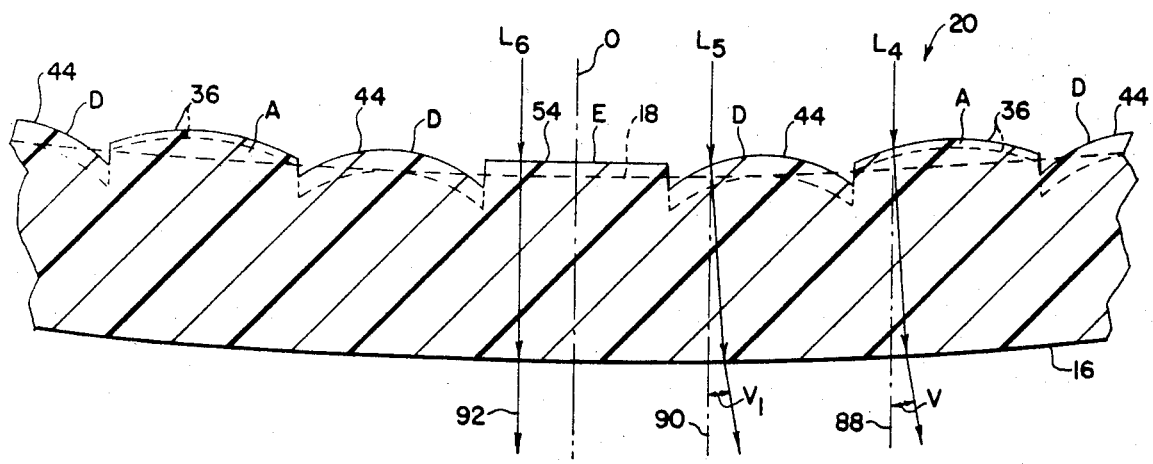
FIG. 12 is a vertical sectional view taken along line 12—12 in FIG. 1, and illustrates certain light directing characteristics of the lenticular elements.

FIG. 10 is a horizontal section through the traffic signal assembly illustrated in FIG. 9 and, together with FIG. 12 illustrates the manner in which beams of light are reflected toward the lens by reflector 62 and are diverted laterally of the lens axis by the lenticular elements. As illustrated in FIG. 12, a light beam L4 is reflected toward a lenticular element A in the central area 24 of the lens along a path 88 parallel to the lens axis. The cylindrical outer surface 36 of element A diverts beam L4 laterally of path 88 toward outer surface 16 of the lens. Outer surface 16 of the lens further diverts the beam of light relative to path 88, whereby beam L4 is projected forwardly and laterally of the lens at an angle V relative to the lens axis. Similarly, a beam of light L5 is reflected toward outer surface 44 of a horizontally centrally located lenticular element D along a path 90 parallel to the lens axis and is diverted laterally by surface 44 toward outer surface 16 of the lens. The light beam is further diverted laterally of path 90 by outer surface 16 of the lens whereby the beam is projected forwardly and laterally of the lens at an angle V1 relative to the lens axis. Further, a light beam L6 is reflected toward planar surface 54 of a horizontally centrally disposed lenticular element E along a path 92 parallel to the lens axis and, in this instance, in a direction normal to surface 54 and lens surfaces 16 and 18. Since the light beam is normal to the latter surfaces it is not laterally diverted with respect to the lens axis. With regard to lateral light diversion by elements A and D, it will be appreciated that maximum light diversion occurs when the angle between the light beam and curved outer surface is largest. Thus, the diversions of beams L4 and L5 illustrated in FIG. 12 are between minimum and maximum with respect to the particular elements A and D illustrated.

Light beams L4, L5 and L6 are depicted in conjunction with lenticular elements A, D and E disposed in horizontally central area 24 of the lens. Thus, a line horizontally centrally of the outer surfaces of elements A, D and E and normal to lens surfaces 16 and 18 is substantially parallel to lens axis O. Accordingly, beams of light reflected toward the flat outer surfaces of elements E are projected forwardly substantially parallel to the lens axis, and beams reflected toward the curved outer surfaces of elements A and D and on laterally opposite sides of the line will be projected forwardly of the lens and in laterally opposite directions relative to the lens axis. This provides a high magnitude of light intensity centrally of the viewing range of the lens, thus to increase the effective distance of the viewing range forwardly of the lens. Since the horizontal rows of elements curve relative to the lens axis, the orientations of the outer surfaces of the lenticular elements relative to the lens axis vary from the lens axis toward the outer ends of the rows, as illustrated in FIG. 10. More particularly, with regard to succeeding elements laterally outwardly along a given row, a line horizontally centrally of one element and normal to lens surfaces 16 and 18 will extend at a greater angle to the lens axis than a similar line of a preceeding element in that row. Thus, the outer surfaces of the elements are progressively disposed at a greater angle relative to the lens axis, and this effects the lateral light directing characteristics of the elements. In this respect, the horizontally curved outer surface 44 of an element D in an intermediate area 26 of the lens will divert less light laterally inwardly of the lens axis and more light laterally outwardly thereof than an element D disposed in central area 24. Further, an element D in a laterally outer area 28 of the lens will divert less light laterally inwardly of the lens axis and move light laterally outwardly thereof than an element D in an intermediate area 26. However, as is seen in FIG. 1A, there are fewer elements D in the outer areas 28 than in intermediate areas 26 whereby lateral scattering of light beyond the sides of the lens is minimal and the desired high magnitude of illumination within the viewing range is obtained.

Undesirable light scattering laterally of the lens is further controlled in accordance with the present invention by the provision of lenticular elements B and C in the intermediate and outer areas of the lens. In this respect, it will be remembered that the cylindrical outer surfaces of elements B have a longer radius of curvature than elements A and that the outer surfaces of elements C have a longer radius of curvature than elements B. If the outer surfaces of elements A, B and C all had the same radius of curvature, light diversion laterally outwardly of the lens axis by these elements would, as mentioned above with regard to elements D, increase progressively as the outer ends of the rows of elements were approached. The radius of curvature of the outer surfaces of elements A is chosen to provide for these elements to have desired limits of lateral light diversion with respect to the horizontally central area of the lens whereby lines horizontally centrally of these elements and normal to lens surfaces 16 and 18 are generally parallel to lens axis O. By increasing the radius of curvature of the outer surfaces of elements B in intermediate areas 26 of the lens, the outer surfaces are flatter relative to the outer surfaces of elements A. Since elements B are turned toward lens axis O, the flatter outer surfaces thereof reduce light diversion laterally outwardly of the lens axis from that which would be realized by rounder surfaces. Thus, lateral outward light diversion is controlled and increased projection of light into the desired viewing range by elements B is achieved. Similarly, by increasing the radius of curvature of the outer surfaces of element C with respect to the radius of curvature of elements B, the outer surfaces of elements C are flatter than those of element B. Since elements C are turned more toward lens axis O than elements B, the flatter surfaces of elements C reduce light diversion laterally outwardly of the lens axis from that which would be realized by rounder surfaces. Thus, lateral outward diversion of light from outer areas 28 of the lens is controlled, whereby increased light projection into the desired viewing range is achieved.

With regard to the planar surfaces 54 of elements E in the intermediate and outer lens areas 26 and 28, respectively, very little lateral light diversion is realized. In this respect, surfaces 54 and the corresponding portions of outer surface 16 of the lens are substantially parallel surfaces. Thus, even though a surface 54 in area 26 or 28 is turned toward lens axis O, a light beam reflected toward surface 54 will be displaced during projection through the lens but will not be diverted to any appreciable extent. Thus, the beam of light will be reflected toward surface 54 in a direction parallel to the lens axis, will be directed by surface 54 toward outer surface 16 of the lens at an angle relative to the lens axes, and will be directed by surface 16 back substantially to the initial direction parallel to the lens axis. Accordingly, when viewed from above elements E provide for light to be directed forwardly of the lens and generally parallel to the lens axis thus to increase the mangitude of light projected into the viewing range of the lens.

Accordingly, it will be appreciated that all of the lenticular elements cooperate to provide a high magnitude of illumination in the straight ahead or substantially straight ahead and slightly downward direction while allowing sufficient illumination to occur laterally of the lens sides so that the light signal is readily visible to a vehicle driver or pedestrian who is to one side or the other of a straight ahead position with regard to the signal. In the preceding description of the light diverting characteristics of the lenticular elements, the characteristics are described with regard to light beams reflected toward the lenticular elements along paths parallel to the lens axis. It will be appreciated, however, that the lamp filament is not a true point light source located at the focus of the reflector. Accordingly, as illustrated in FIGS. 9 and 10 there will be a spreading of the light beams as designated for example, by the numeral 68 in FIG. 9. The spread resulting rom the filament will increase or decrease the angles of downward and lateral deflection of lenticular elements A, B, C, D and E by about 5 degrees depending on the location of the particular lenticular element relative to the horizontal and vertical diametric lines of the lens.

As an example of a lens made in accordance with the principals of the present invention and having the light diverting characteristics described hereinabove, the lens has a body portion made of polycarbonate material having an outer diameter of about 11.9 inches and a diameter within the annular rim portion of about 10.9 inches. The inner and outer surfaces of the lens are spherical and the outer surface is smooth and has a radius of curvature of approximately 8.123 inches. The inner surface of the lens has a radius of curvature of approximately 7.998 inches. The inner surface of the lens is completely covered by lenticular elements A, B, C, D and E arranged as illustrated in FIGS. 1 and 1A of the drawing, and the lenticular elements have the dimensions set forth in Table 1 below wherein the letters correspond with those depicted in FIGS. 3–8 of the drawing.

TABLE I

| Lenticular element | Dimensions | | | | | | |
| --- | --- | --- | --- | --- | --- | --- | --- |
| | W in. | H in. | R in. | R' in. | X° | Y° | Z° |
| A | 0.250 | 0.125 | 0.312 | | 94¼ | | 3 |
| B | .250 | .125 | .343 | | 94¼ | | 3 |
| C | .250 | .125 | .375 | | 94¼ | | 3 |
| D | .250 | .125 | .213 | 0.465 | | 20 | 3 |
| E | .250 | .125 | | | | 95 | 3 |

Further, a lens having the same dimensions and having an inner surface completely covered by lenticular elements A, B, C, D and E arranged in the pattern illustrated in FIGS. 1 and 1A and having the projected horizontal width and projected vertical heighth dimensions set forth in Table 1 includes approximately 110 elements A, approximately 190 elements B, approximately 72 elements C, approximately 2,400 elements D and approximately 168 elements E. Accordingly, it will be appreciated that elements D are predominant in number to the extent that these elements define a field in which the elements A, B, C and E are interspersed. Based on the above numbers, there is a total of approximately 540 of the elements A, B, C and E interspersed in a field of approximately 2,400 elements D, whereby the ratio of elements D to the total of the remaining elements is approximately 4.4:1.

As mentioned hereinabove, the preferred material for forming the lens is a polycarbonate which has a greater resistance to heat, breakage, scratching and the like than any other lens material presently known. Polycarbonate can be readily molded and is available in standard colors including the red, green and amber colors employed in various types of traffic, pedestrian and other warning signals.

The configurations of the several lenticular elements and the arrangement thereof relative to the inner surface of the lens provide for lenses made in accordance with the present invention to be readily produced by a molding process. In this respect, a mold for forming the lenticular elements on the inner surface of the lens may be defined by a stack of steel plates each having a thickness equal to the projected vertical heighth of a corresponding row of lenticular elements. The forming surfaces of the steel plates may be provided with the contours necessary to produce lenticular elements A, B, C and D by means of end mill cutters having the appropriate contours. Further, the forming surfaces of the steel plates may be provided with the necessary contour to form the planar surfaces of lenticular elements E by means of end mill cutters having flat end surfaces. This method of contouring the forming surfaces of the steel plates assures a uniformity of the contours of the lenticular areas throughout the lens and substantially reduces the cost of mold preparation. As mentioned hereinabove, the upper and lower faces of elements A, B and C and the lower faces of elements D and E are provided with a draft angle of about 3 degrees so as to provide sufficient draft to permit removal of the lens from the mold without interference.

While considerable emphasis has been placed herein on the fact that the several lenticular elements are provided on the inner surface of the lens in a specific pattern arrangement it will be appreciated that the pattern could be altered without departing from the principals of the present invention. Further, the number of elements of each type can vary depending on the lens size and/or the projected width and height dimensions of the elements. Preferably, however, the ratio of elements A, B, C and E to elements D will remain generally the same. Moreover, while specific angles of incline of certain of the lenticular elements relative to the inner surface of the lens and specific radii of curvature of the outer surfaces of certain of the elements have been described, it will be appreciated that the invention is not limited in this respect. Likewise, it will be appreciated that the rectangular lenticular elements can have projected width and heighth dimensions other than the specific dimensions described herein. Still further, while each of the plurality of elements A, B, C, D and E are described herein as being identical to one another and identically related with respect to the inner surface of the lens, it will be appreciated that these relationships can be varied without departing from the principals of the present invention.

Having thus described my invention, I claim:

1. A traffic signal lens comprising, a body portion having inner and outer surfaces, lenticular element means covering substantially the entire inner surface of the body portion for directing light in a common direction relative to the axis of said lens, said lenticular element means including a plurality of structurally similar and dimensionally distinct first, second and third lenticular elements disposed in corresponding and separate first, second and third areas of said inner surface, said first, second and third lenticular elements having cylindrical outer surfaces inclined with respect to said inner surface to direct light in said common direction, the radii of curvature of said outer surfaces of said first, second and third lenticular elements being different from one another.

2. The lens according to claim 1, wherein one of said first, second and third areas is disposed centrally of said inner surface relative to a diametrical line thereacross, and the others of said first, second and third areas are disposed laterally of said one area and said line.

3. The lens according to claim 1, wherein said first, second and third areas include a first area having opposite sides, a pair of second areas one adjacent each of said opposite sides, and a pair of third areas one adjacent each said second areas and spaced from said first area thereby.

4. The lens according to claim 3, wherein all of said areas are symmetrical with respect to a diametrical line across said inner surface.

5. The lens according to claim 1, wherein the individual ones of said first, second and third lenticular elements are spaced apart from one another in the corresponding one of said first, second and third areas.

6. The lens according to claim 5, wherein said individual lenticular elements are disposed in the corresponding area in spaced apart parallel rows.

7. The lens according to claim 6, wherein said individual lenticular elements are spaced apart in said rows and oriented for the axes of said cylindrical outer surfaces to be parallel to one another.

8. The lens according to claim 7, wherein said lenticular element means further includes fourth lenticular elements between said individual lenticular elements in said rows, said fourth lenticular elements having outer surface contours defining a partial section of a toroid.

9. The lens according to claim 7, wherein the individual lenticular elements in one row are laterally offset in the one row relative to the individual lenticular elements in the next adjacent of said parallel spaced apart rows.

10. The lens according to claim 7, wherein said lenticular element means includes fourth lenticular elements having an outer surface contour defining a partial section of a toroid, and wherein said parallel rows are spaced apart by a row of said fourth lenticular elements.

11. The lens according to claim 10, wherein said lenticular element means includes fifth lenticular elements having a planar outer surface contour, and wherein said individual lenticular elements are spaced apart in said rows by said fourth and fifth lenticular elements.

12. The lens according to claim 11, wherein said parallel rows of individual lenticular elements in each said first, second, and third areas are in end to end alignment with the parallel rows in the adjacent one of said areas.

13. The lens according to claim 12, wherein the individual lenticular elements in one of said parallel spaced apart rows are laterally offset in the one row relative to the individual lenticular elements in the next adjacent of said parallel spaced apart rows.

14. A traffic signal lens comprising a body portion having inner and outer surfaces, lenticular element means covering substantially the entire inner surface of said body portion for directing light primarily in a common direction relative to the lens axis, said lenticular element means including a plurality of first, second and third groups of lenticular elements disposed in corresponding and separate first, second and third areas of said inner surface, said lenticular elements of each group having cylindrical outer surfaces inclined with respect to said inner surface to direct light in said common direction, and said cylindrical outer surfaces of the elements in each group having a different radius of curvature from the outer surface of the elements in the other groups, individual ones of said first, second and third lenticular elements being spaced apart in the corresponding one of said first, second and third areas, and said lenticular element means including fourth lenticular elements between said individual lenticular elements, said fourth lenticular elements having an outer surface contour defining a partial section of a toroid.

15. The lens according to claim 14, wherein said individual lenticular elements are disposed in spaced apart parallel rows and at least some of said fourth lenticular elements are disposed in a row between said parallel rows.

16. The lens according to claim 15, wherein said individual lenticular elements are spaced apart in said parallel rows and others of said fourth lenticular elements are disposed in the space between adjacent individual lenticular elements in said parallel rows.

17. The lens according to claim 16, wherein said lenticular element means includes fifth lenticular elements having an outer surface contour different from the first, second, third and fourth lenticular elements, said fifth lenticular elements being disposed in said spaces between said individual lenticular elements.

18. The lens according to claim 17, wherein said fifth lenticular elements have planar outer surfaces inclined relative to said inner surface to direct light in said common direction.

19. The lens according to claim 18, wherein the outer surfaces of said fourth lenticular elements curve in a first direction corresponding to the direction of curvature of the cylindrical surfaces of said individual lenticular elements and in a second direction generally perpendicular to said first direction, said curvature in said second direction providing for said outer surfaces of said fourth lenticular elements to have an end adjacent said inner surface of said body portion and an opposite end spaced from said inner surface.

20. The lens according to claim 19, wherein the angle of incline of the cylindrical surfaces of said individual ones of said first, second and third lenticular elements relative to said inner surface is the same.

21. A traffic signal lens comprising, a body portion having generally spherical inner and outer surfaces and an axis generally horizontally disposed during use of the lens, first, second, third, fourth and fifth lenticular elements substantially covering said inner surface in patterns symmetrical with respect to a vertical diametrical line thereacross, said first, second, third, fourth and fifth lenticular elements having outer surface contours providing for the lenticular elements to direct light primarily downwardly relative to said lens axis and providing for at least some of the elements to direct light laterally with respect to a line through the element and normal to said inner surface of said body portion, said first, second and third lenticular elements each having a cylindrical outer surface inclined at the same angle relative to said inner surface of said body portion so as to direct light primarily downwardly relative to said lens axis, the radii of curvature of said outer surfaces of said first, second and third lenticular elements being different from one another, whereby the elements of each said first, second and third lenticular elements direct light laterally relative to an axis through the curved outer surface thereof and normal to said inner surface of said lens and whereby the elements of each said first, second and third lenticular elements direct light laterally to different extents relative to the others, said inner surface of said lens body including a central area extending laterally from opposite sides of said diametrical line, intermediate areas laterally outwardly of the opposite sides of said central area and outer areas laterally outwardly of said intermediate areas, said first lenticular elements being disposed in one of said areas, said second lenticular elements being disposed in another of said areas, said third lenticular element being disposed in the remaining of said areas, and said fourth and fifth lenticular elements being structurally distinct in contour from said first, second and third elements and disposed in each of said areas.

22. The lens according to claim 21, wherein the individual ones of said first, second and third lenticular elements are disposed in the corresponding area in horizontally and vertically spaced apart relationship relative to one another.

23. The lens according to claim 22, wherein the ones of said fourth and fifth lenticular elements disposed in said corresponding area fill the spaces between said individual lenticular elements therein.

24. A traffic signal lens comprising, a body portion having generally spherical inner and outer surfaces and an axis generally horizontally disposed during use of the lens, first second, third, fourth and fifth lenticular elements substantially covering said inner surface in patterns symmetrical with respect to a vertical diametrical line thereacross, said first, second, third, fourth and fifth lenticular elements having outer surface contours providing for the lenticular elements to direct light primarily downwardly relative to said lens axis and providing for at least some of the elements to direct light laterally with respect to a line through the element and normal to said inner surface of said body portion, said inner surface including a central area extending laterally from opposite sides of said diametrical line, intermediate areas laterally outwardly of the opposite sides of said central area and outer areas laterally outwardly of said intermediate areas, said first lenticular elements being disposed in one of said areas, said second lenticular elements being disposed in another of said areas, said third lenticular elements being disposed in the remaining of said areas, and said fourth and fifth lenticular elements being disposed in each of said areas, the individual ones of said first, second and third lenticular elements being disposed in the corresponding area in horizontally and vertically spaced apart relationship relative to one another, the ones of said fourth and fifth lenticular elements disposed in said corresponding area filling the spaces between said individual lenticular elements therein, said first, second and third lenticular elements each have a cylindrical outer surface inclined at the same angle relative to said inner surface of said body portion so as to direct light primarily downwardly relative to said lens axis, and the radii of curvature of said outer surfaces of said first, second and third lenticular elements being different from one another, whereby the elements of each said first, second and third lenticular elements direct light laterally relative to an axis through the curved outer surface thereof and normal to said inner surface of said lens and whereby the elements of each said first, second and third lenticular elements direct light laterally to different extents relative to the others, said fourth lenticular elements having an outer surface contour defining a partial section of a toroid and curving in one direction for said fourth elements to direct light downwardly relative to said lens axis and curving in another direction for said fourth elements to direct light laterally relative to an axis through the line of curvature in said another direction and normal to said inner surface of said body portion.

25. The lens according to claim 24, wherein the radius of curvature of the outer surface of said fourth lenticular elements in said another direction is less than the radii of curvature of the outer surfaces of said first, second and third lenticular elements.

26. The lens according to claim 25, wherein said fifth lenticular elements each have a planar surface inclined relative to the inner surface of said body portion for said fifth elements to direct light downwardly relative to said lens axis, said planar surface being normal in a horizontal direction to a line therethrough and normal to said inner surface of said body portion.

27. The lens according to claim 26, wherein the angle of incline of said planar surface is greater than the angle of incline of said cylindrical surfaces of said first, second and third lenticular elements.

28. The lens according to claim 27, wherein the curvature of the outer surface of said fourth lenticular elements in said one direction provides for said forth elements to direct light downwardly relative to said lens axis at a greater angle than said first, second, third and fifth elements.

29. The lens according to claim 28, wherein said fourth lenticular elements are disposed in the spaces between the horizontally spaced ones of said individual ones of said first, second and third lenticular elements in said corresponding area of said inner surface of said body portion.

30. The lens according to claim 28, wherein said fourth and fifth lenticular elements are disposed in a pattern in the spaces between horizontally adjacent ones of said individual ones of said first, second and third lenticular elements in said corresponding area of said inner surface of said body portion.

31. The lens according to claim 30, wherein said first lenticular elements are disposed in said central area, said second lenticular elements are disposed in said intermediate areas and said third lenticular elements are disposed in said outer areas.

32. A traffic signal lens comprising, a body portion having vertically orientable inner and outer surfaces, pluralities of first, second, third, fourth and fifth lenticular elements substantially covering said inner surface, said first, second, third, fourth and fifth lenticular elements having outer surface contours providing for the lenticular elements to direct light forwardly and downwardly relative to said outer surface of the lens and providing for said first, second, third and fourth elements to have distinct light directing characteristics for directing light forwardly and laterally with respect to a line therethrough and normal to said inner and outer lens surfaces one of said first, second, third, fourth and fifth lenticular elements being predominant in number on said inner surface and defining a field of elements, and the others of said first, second, third, fourth and fifth lenticular elements being interspersed in said field, the ratio of the lenticular elements defining said field to the total of said others of said first, second, third, fourth and fifth elements being about 4.4 to 1, said lenticular elements defining said field each having outer surfaces curving about first and second perpendicular axes and oriented on said inner surface of said body portion for the surfaces thereof curving about one of said axes to direct light downwardly and the surfaces curving about the other of said axes to direct light laterally, the others of said first, second, third, fourth and fifth lenticular elements including a plurality of each of three similarly contoured and distinctly dimensioned lenticular elements having cylindrical outer surfaces oriented and inclined at substantially the same angle relative to said inner surface, said cylindrical outer surfaces of said three lenticular elements having different radii of curvature.

33. The lens according to claim 32, wherein said plurality of each of said three lenticular elements are disposed in separate areas of said field.

34. The lens according to claim 33, wherein said others of said first, second, third, fourth and fifth lenticular elements includes a plurality of planar surface elements inclined at substantially the same angle relative to said inner surface of said body portion, said planar surface elements being dispersed throughout said field.

35. The lens according to claim 34, wherein said separate areas include a first area extending across said field centrally thereof, a second area laterally outwardly of each side of said first area and a third area laterally outwardly of each side of said first area and a third area laterally outwardly of each second area, the plurality of one of said three lenticular elements being disposed in said first area, the plurality of a second of said three lenticular elements being disposed in said second area, and the plurality of a third of said three lenticular elements being disposed in said third area.

36. The lens according to claim 35, wherein the radius of curvature of the cylindrical surfaces of the lenticular elements in said first area is less than the radius of curvature of the cylindrical surfaces of the elements in said second area and the latter radius of curvature is less than the radius of curvature of the cylindrical surfaces of the elements in said third area.

37. The lens according to claim 36, wherein the radius of curvature of said outer surfaces of said lenticular elements defining said field curving about said other of said perpendicular axes is less than the radius of curvature of the cylindrical surfaces of the lenticular elements in said first, second and third areas.

38. A traffic signal lens comprising a body portion having inner and outer surfaces and a central axis disposed generally horizontally when said lens is in use, rows of lenticular elements extending generally horizontally across said inner surface, at least one of said rows including a plurality of each of three structurally distinct types of lenticular elements each of which types has a surface contour for directing light downwardly and at least two of which types have a surface contour for directing light laterally, a first one of said types of lenticular elements having an outer surface defining a partial section of a toroid, a second one of said types of lenticular elements having a cylindrical outer surface inclined and convex with respect to said inner surface of said body portion, and the third of said types of lenticular elements having a planar outer surface, said three types of elements having generally the same vertical dimension in said one row.

39. The lens according to claim 38, wherein said first one of said types of elements is predominant in number in said one row.

40. The lens according to claim 39, wherein adjacent ones of said second types of lenticular elements are spaced apart in said one row by a pair of said first type of elements and one of said third type of elements disposed between said pair.

41. The lens according to claim 40, wherein another of said rows includes a plurality of each of said three types of lenticular elements similarly oriented in said another row relative to one another.

42. The lens according to claim 40, wherein a second and third of said rows include a plurality of each of said three types of lenticular elements similarly oriented relative to one another in the corresponding row.

43. The lens according to claim 42, wherein each said third type elements in any one of said one, second and third rows is vertically aligned with one of said second type elements in a vertically adjacent one of said one, second and third rows.

44. The lens according to claim 43, wherein adjacent ones of said one, second and third rows are vertically spaced apart by an intermediate row of said first type of lenticular elements.

45. A traffic signal lens comprising a body portion having spherical inner and outer surfaces and a central axis disposed generally horizontally when said lens is in use, rows of lenticular elements extending generally horizontally across said inner surface, at least one of said rows including two lenticular elements spaced apart in said one row and having cylindrical outer surfaces the radii of curvature of which is different, a pair of generally identical lenticular elements having outer surfaces defining a portion of the section of a toroid, and a single lenticular element having a planar outer surface, said identical and said single elements being disposed in the space between said two elements with said single element between said identical elements, said two, identical and single elements being oriented in said row for the outer surfaces of each to direct light forwardly and downwardly relative to the lens axis and for the outer surfaces of said two and said identical elements to direct light forwardly and laterally relative to said axis, said different radii of curvature of said cylindrical surfaces providing for said two elements to have different lateral light directing capabilities.

46. The lens according to claim 45, wherein a second of said rows includes said two, identical and single lenticular elements similarly oriented in said second row relative to one another.

47. The lens according to claim 46, wherein a third of said rows includes said two, identical and single lenticular elements similarly oriented in said third row relative to one another.

48. The lens according to claim 47 wherein one of said two lenticular elements in any one of said one, second and third rows is in vertical alignment with the single lenticular element in an adjacent one of said one, second and third rows.

49. The lens according to claim 48, wherein said one and second and said second and third rows are vertically spaced apart by intermediate rows each defined by a plurality of said identical lenticular elements.

50. A traffic signal lens comprising a body portion having inner and outer surfaces and an axis disposed generally horizontal when said lens is in use, rows of lenticular elements extending generally horizontally across said inner surface, at least one of said rows including at least one each of three lenticular elements spaced apart in said one row and having cylindrical outer surfaces the radii of curvature of which is different, generally identical lenticular elements disposed in pairs between adjacent ones of said three elements and having outer surfaces defining a portion of a section of a toroid, a single lenticular element disposed between each pair of said identical elements and having a planar surface, said three, identical and single lenticular elements being oriented in said one row for the outer surfaces of each to direct light forwardly and downwardly with respect to said axis and for the outer surfaces of said three and identical elements to direct light forwardly and laterally with respect to said axis.

51. The lens according to claim 50, wherein a second and a third of said rows each include said three, identical and single lenticular elements similarly oriented in the corresponding one of said second and third rows.

52. The lens according to claim 51, wherein each of said three lenticular elements in any one of said one, second and third rows is vertically aligned with one of said single elements in an adjacent one of said one, second and third rows.

53. The lens according to claim 52, wherein adjacent ones of said one, second and third rows are spaced apart by intermediate rows each defined by a plurality of said identical lenticular elements.

* * * * *